(12) United States Patent
Furuta et al.

(10) Patent No.: US 10,437,211 B2
(45) Date of Patent: Oct. 8, 2019

(54) SIMULATION SYSTEM

(71) Applicant: OMRON Corporation, Kyoto-shi, Kyoto (JP)

(72) Inventors: Katsuhisa Furuta, Suita (JP); Katsuji Takeshita, Kyoto (JP); Naoki Ohara, Ibaraki (JP)

(73) Assignee: OMRON Corporation, Kyoto-shi (JP)

( * ) Notice: Subject to any disclaimer, the term of this patent is extended or adjusted under 35 U.S.C. 154(b) by 205 days.

(21) Appl. No.: 14/721,309

(22) Filed: May 26, 2015

(65) Prior Publication Data

US 2015/0338834 A1   Nov. 26, 2015

(30) Foreign Application Priority Data

May 26, 2014   (JP) .................................. 2014-108564

(51) Int. Cl.
*G05B 17/02* (2006.01)
*G05B 19/4069* (2006.01)
*G05B 19/418* (2006.01)

(52) U.S. Cl.
CPC ......... *G05B 17/02* (2013.01); *G05B 19/4069* (2013.01); *G05B 19/41885* (2013.01);
(Continued)

(58) Field of Classification Search
CPC ................ G05B 17/02; G05B 19/4069; G05B 19/41885; G05B 2219/13174; Y02P 90/26; Y02P 90/265
(Continued)

(56) References Cited

U.S. PATENT DOCUMENTS 5,432,352 A * 7/1995 van Bavel ........... H01J 37/3171
250/440.11
6,608,638 B1 * 8/2003 Kodosky ............. G06F 11/2294
703/22
(Continued)

FOREIGN PATENT DOCUMENTS

CN   1879069 A   12/2006
CN   101145047 A   3/2008
(Continued)

OTHER PUBLICATIONS

The Chinese Office Action dated May 31, 2017 in the counterpart Chinese patent application.
(Continued)

*Primary Examiner* — Kenneth M Lo
*Assistant Examiner* — Michael W Choi
(74) *Attorney, Agent, or Firm* — Metrolex IP Law Group, PLLC

(57) ABSTRACT

A simulation system includes a control device for controlling a control object; and an information processing device configured to exchange data with the control device. The control device includes a computation unit configured to execute sequence control and motion control of the control object; and an output unit configured to output a fixed interval of data related to the sequence control and the motion control of the object. The information processing device includes a storage module configured to store design data representing at least a portion of the configuration of the control object; and a visualization module configured to present a visual representation of the behavior of the control object around a period in time that satisfies a predetermined criteria using the fixed interval of data output from the control device, and the design data, where the fixed interval of data from the control device the visualization module uses
(Continued)

is the fixed interval of data over a predetermined period that includes the period in time.

8 Claims, 17 Drawing Sheets

(52) U.S. Cl.
CPC ..... *G05B 2219/13174* (2013.01); *Y02P 90/26* (2015.11); *Y02P 90/265* (2015.11)

(58) Field of Classification Search
USPC .......................................................... 700/31
See application file for complete search history.

(56) References Cited

U.S. PATENT DOCUMENTS

| | | | |
|---|---|---|---|
| 9,360,861 B2* | 6/2016 | Hahn | G05B 19/4069 |
| 2002/0059054 A1* | 5/2002 | Bade | G06F 17/5022 |
| | | | 703/20 |
| 2002/0107077 A1* | 8/2002 | Buhler | A63B 24/0021 |
| | | | 473/151 |
| 2003/0074170 A1* | 4/2003 | Watanabe | B25J 9/1671 |
| | | | 703/6 |
| 2005/0055186 A1 | 3/2005 | Ishiwata et al. | |
| 2007/0088533 A1 | 4/2007 | Serizawa | |
| 2007/0299642 A1* | 12/2007 | Kondo | G06F 17/5009 |
| | | | 703/6 |
| 2008/0091394 A1* | 4/2008 | Hahn | G05B 19/4069 |
| | | | 703/7 |
| 2012/0101613 A1 | 4/2012 | Kapoor et al. | |
| 2013/0060378 A1 | 3/2013 | Schmitz et al. | |
| 2013/0124184 A1* | 5/2013 | Sakaguchi | G05B 19/4069 |
| | | | 703/22 |

FOREIGN PATENT DOCUMENTS

| | | |
|---|---|---|
| CN | 203083701 U | 7/2013 |
| EP | 1901149 A2 | 3/2008 |
| JP | 2005-108204 A | 4/2005 |
| JP | 2006-92123 A | 4/2006 |
| JP | 2007-18145 A | 1/2007 |
| JP | 2012-118567 A | 6/2012 |
| JP | 5032764 B2 | 9/2012 |
| JP | 2013-517151 A | 5/2013 |

OTHER PUBLICATIONS

The Japanese Office Action dated Nov. 28, 2017 in the counterpart Japanese patent application.
The Japanese Office Action (JPOA) dated Jul. 3, 2018 in the counterpart Japanese patent application.

* cited by examiner

| Count Value | MI_DO_001 | MI_DO_002 | MI_Axis_x | MI_Axis_Y | MI_Axis_Z | ... | MI_DI_001 | MI_DI_002 | ... |
|---|---|---|---|---|---|---|---|---|---|
| ... | ... | ... | ... | ... | ... | ... | ... | ... | ... |
| 1058421 | 0 | 0 | 90 | 0 | 0 | | 1 | 1 | |
| 1058422 | 0 | 0 | 90 | 0 | 0 | | 1 | 1 | |
| 1058423 | 0 | 1 | 90 | 1 | 2 | | 1 | 1 | |
| 1058424 | 0 | 1 | 90 | 2 | 4 | | 1 | 1 | |
| 1058425 | 0 | 1 | 90 | 3 | 6 | | 0 | 1 | |
| 1058426 | 1 | 1 | 90 | 4 | 8 | | 0 | 1 | |
| 1058427 | 1 | 1 | 90 | 5 | 10 | | 0 | 1 | |
| 1058428 | 1 | 1 | 90 | 6 | 12 | | 0 | 1 | |
| 1058429 | 1 | 1 | 90 | 7 | 14 | | 0 | 1 | |
| 1058430 | 1 | 1 | 90 | 8 | 16 | | 0 | 0 | |
| 1058431 | 1 | 1 | 90 | 9 | 18 | | 0 | 0 | |
| 1058432 | 1 | 1 | 90 | 10 | 18 | | 0 | 0 | |
| 1058433 | 1 | 1 | 90 | 11 | 18 | | 0 | 0 | |
| ... | ... | ... | ... | ... | ... | ... | ... | ... | ... |

FIG. 4

SIMULATION SYSTEM

FIELD

The present invention relates to a simulation system including a control device that controls a control object.

BACKGROUND

Different production sites are introducing various kinds of factory automation (FA) technologies. Further, more advanced information processing technologies are being introduced into FA with recent advancements in information and communication technology (ICT).

One proposed application of ICT in FA involves evaluating a device through, for instance, verifying the behavior of the device, or evaluating the stability of the device. This verification and evaluation is performed only through simulation without actually operating the manufacturing device.

For example, Japanese Unexamined Patent Application Publication No. 2009-018145 (Patent Document 1) discloses a machine tool interference checker provided with a numerical control device (NC device), and the like. The machine tool moves at least one of a work piece or a tool to process the work piece. Japanese Unexamined Patent Application Publication No. 2009-018145 indicates that the interference checker is for preventing a collision when moving the work piece or the tool.

Technical Problem

The device disclosed in the above-described Japanese Unexamined Patent Application Publication No. 2009-018145 preliminarily evaluates whether or not an object will interfere with the machine tool functioning as the manufacturing device, and thus is limited to adoption in a machine tool. Additionally, given that the objective of the above described interference checker is primarily to evaluate the appropriateness of a processing program after the machine tool is designed, the interference checker cannot be used to evaluate the appropriateness of the machine design.

Desired is a simulation system that is more suitable for verifying and evaluating the behavior of a manufacturing device compared to existing technologies. Also desired is a simulation system capable of suitably verifying and evaluating the behavior of an overall manufacturing system that includes the manufacturing device before the design of the manufacturing device is complete.

SUMMARY

A simulation system according to an embodiment of the invention includes a control device for controlling a control object; and an information processing device configured to exchange data with the control device. The control device includes a computation unit configured to execute sequence control and motion control of the control object; and an output unit configured to output a fixed interval of data related to the sequence control and the motion control of the control object. The information processing device includes a storage module configured to store design data representing at least a portion of the configuration of the control object; and a visualization module configured to present a visual representation of the behavior of the control object around a period in time that satisfies a predetermined criteria using the fixed interval of data output from the control device, and the design data, where the fixed interval of data from the control device that the visualization module uses is the fixed interval of data over a predetermined period that includes the period in time.

The information processing device may further include an analysis module configured to align and present control state values for a plurality of entries included in the fixed interval of data output from the control device.

The information processing device may display an operational input element that accepts a user command setting a time period for which the visual representation of the behavior of the control object is presented.

The information processing device may present a visual representation of a site associated with a predetermined criteria.

A simulation system according to another embodiment of the invention includes a control device for controlling a control object; and an information processing device configured to exchange data with the control device. In this embodiment, the information processing device may include a creation and editing module configured to create and edit design data representing at least a portion of the configuration of the control object. The control device may include a computation module configured to treat a fixed interval of data received from the information processing device as input data, execute at least one of a preliminarily defined sequence control or a motion control, and transmit a fixed interval of data computed in accordance with the control executed to the information processing device as output data. The information processing device may also include a visualization module configured to present a visual representation of the control object using the output data from the control device, and the design data; and an output module configured to output a fixed interval of data according to the behavior of the control object being visually presented to the control device.

The information processing device may respond to the control device with information indicating that a predetermined criteria is satisfied when the data output from the control device satisfies the predetermined criteria.

The control device may be implemented in an emulator run on a computer.

The visualization module may update the location of an object corresponding to the control object whenever the data output from the control device is updated.

A simulation system according an embodiment of the invention allows for more suitable verification and evaluation of the behavior of a manufacturing device.

Finally, a simulation system according another embodiment of the invention allows for more suitable verification and evaluation of the behavior of an overall manufacturing system that includes the manufacturing device before the design of the manufacturing device is complete.

BRIEF DESCRIPTION OF THE DRAWINGS

FIG. 4 is a schematic view exemplifying the data exchanged within the simulation system according to an embodiment of the invention;

DETAILED DESCRIPTION

Figure 1:
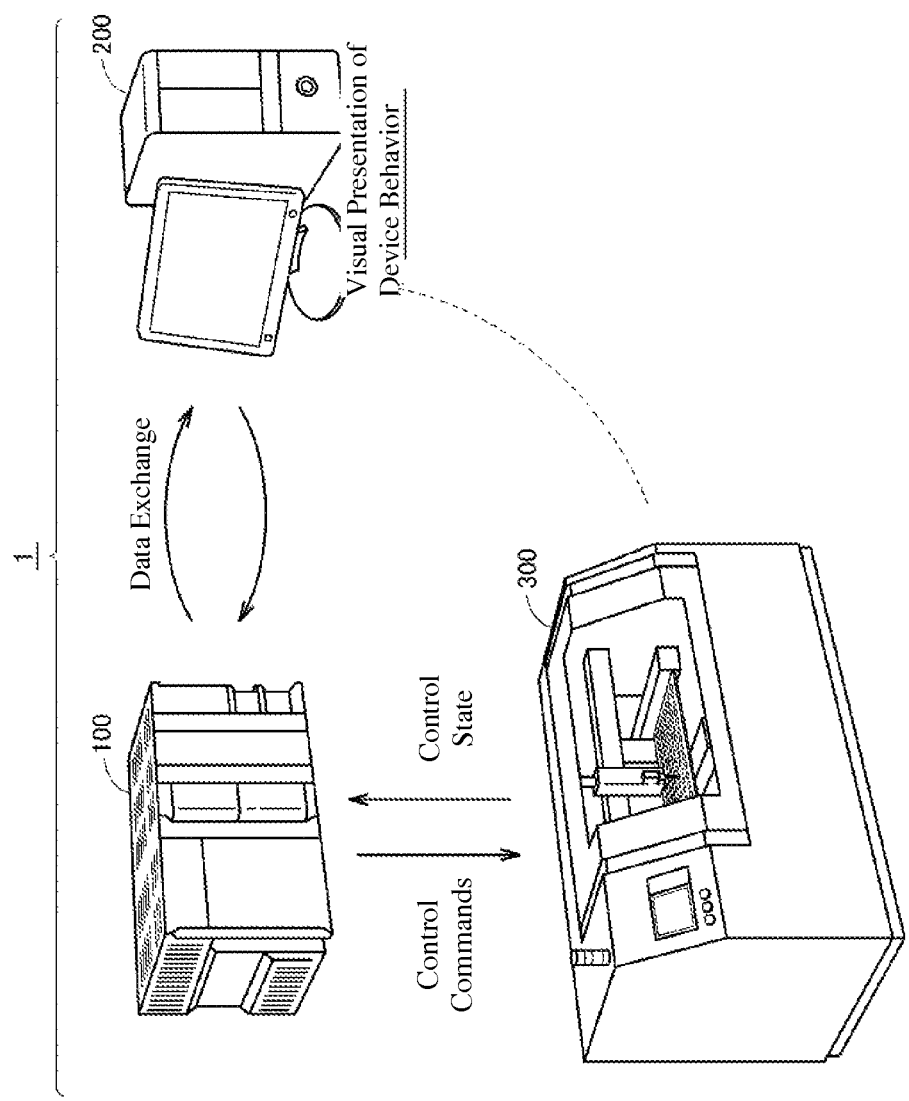
FIG. 1 is a schematic view illustrating an example configuration of a simulation system according to an embodiment of the invention.

Embodiments of the present invention will be described in detail with reference to the drawings. The same or corresponding elements within the drawings will be given the same reference numerals and the explanations therefor will not be repeated.

A. Configuration of the Simulation System

First, the configuration of a simulation system 1 according an embodiment of the invention is described. FIG. 1 is a schematic view illustrating an example configuration of the simulation system 1 according to the embodiment. Referring to FIG. 1, the simulation system 1 according to an embodiment of the invention includes a control device 100 that controls a control object, and an information processing device 200.

The control device 100 is an industrial device, such as a so-called Programmable Logic Controller (PLC). FIG. 1 illustrates a manufacturing device 300 as one example of a control object. The control device 100 supplies the control object with control commands computed using preliminarily programmed control computations, acquires control state values and the like from the control object, and uses the control state values in subsequent control computations. The control commands output from the control device 100 may include binary signals or multi-value signals. The binary signals are used to control, for instance, the opening and closing of a valve, or the on and off of a lamp. The multi-value signals are used to control, for instance, the operational level or operational speed and the like of an actuator such as a stepping motor. The control state values supplied by the control device 100 may also include the state (ON or OFF) of a limit switch or a sensor.

The control device 100 may carry out sequence control or motion control in accordance with the output of each type of sensor. Sequence control is controlling the on or off of an actuator, and the like. Motion control is the continuous control of the operational level or operational speed of the actuator, and the like. That is, the control device 100 executes sequence control and motion control of the control object.

The information processing device 200 is configured for exchanging data with the control device 100, and presents a visual representation of the behavior of the manufacturing device 300 using the information and the like from the control device 100. Computer Aided Design (CAD) programs are installed on the information processing device 200, whereby the CAD program may be used to design the structure of any device. In the simulation system 1 exemplified in FIG. 1, the information processing device 200 stores at least a portion of design data or design data representing a portion of the manufacturing device 300 (e.g., 3D form data for the manufacturing device 300); the information processing device 200 uses the data that is used by the control device 100 to control the manufacturing device 300 (hereafter, also termed "control device data") and the design data to present a visual representation of the behavior of the manufacturing device 300 in real time or after the fact.

As is later described, presenting a visual representation of the behavior of the control object includes using the design data to reproduce a virtual representation of at least a portion of the control object on a display and the like. The position and form of a portion or the entire control object is then changed in accordance with the data used for controlling the manufacturing device 300.

Figure 2:
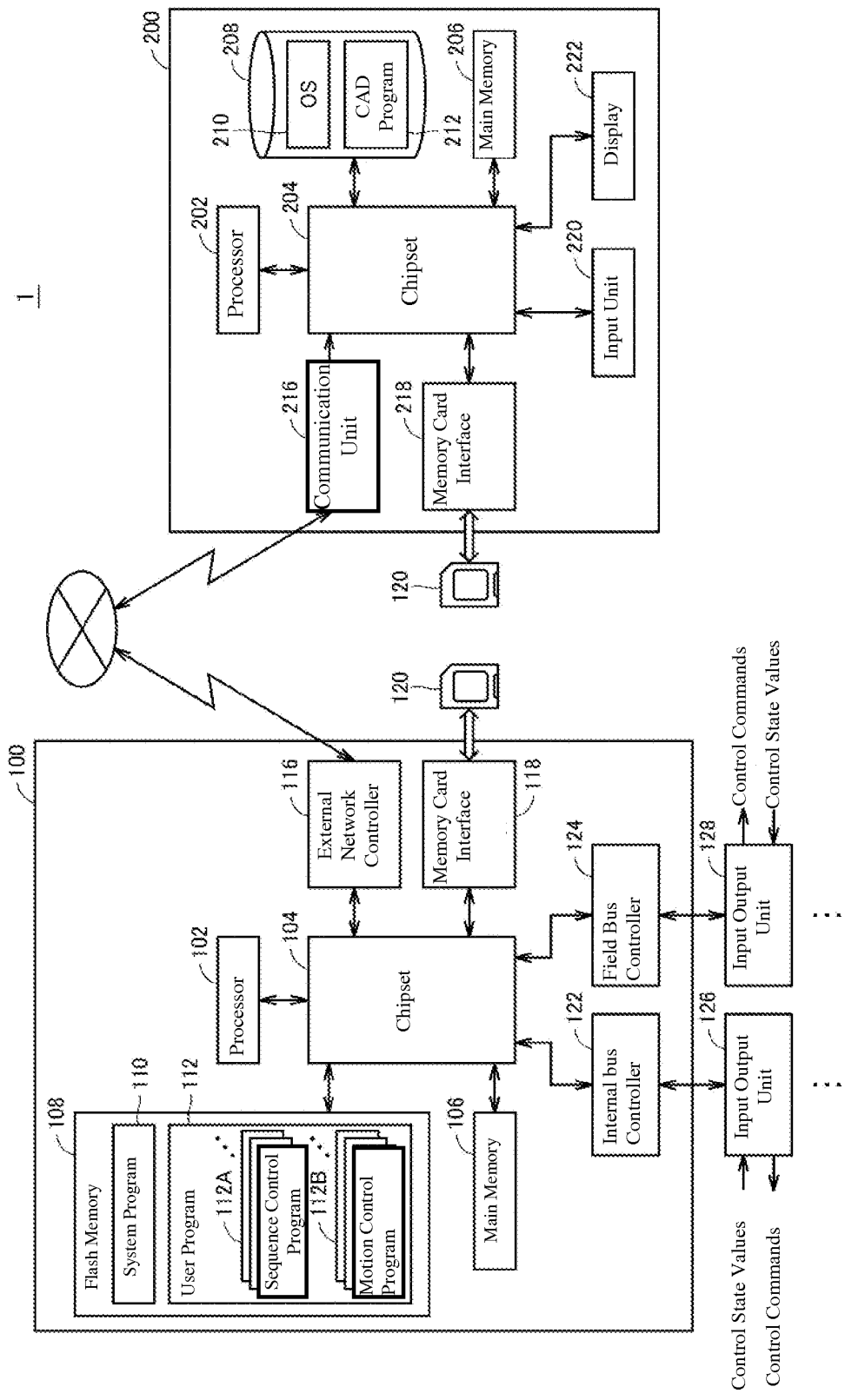
FIG. 2 is a schematic view illustrating an example configuration of the control device and the information processing device in FIG. 1.

FIG. 2 is a schematic view illustrating an example configuration of the control device 100 and the information processing device 200 in FIG. 1.

Referring to FIG. 2, a processor in the control device 100 executes pre-installed programs so that the control device 100 can control the control object. More specifically, the control device 100 includes a processor 102 such as a central processing unit (CPU) or microprocessing unit (MPU), a chipset 104, a main memory 106, a flash memory 108, an external network controller 116, a memory card interface 118, an internal bus controller 122, and a field bus controller 124.

The processor 102 reads a system program 110 and a user program 112 stored in the flash memory 108, loads the programs into the main memory 106, thereby allowing the control device 100 to control the control object. The system program 110 contains command codes that provide the basic functions of the control device 100 such as data input and output processing, and execution timing control. The user program 112 is freely designed depending on the control object, and includes a sequence control program 112A and a motion control program 112B which are respectively for executing sequence control and motion control of the control object.

The chipset 104 implements the overall processing in the control device 100 by controlling each component therein.

The internal bus controller 122 provides an interface for the control device 100 to exchange data with an input output unit 126 connected thereto via an internal bus. The field bus controller 124 provides an interface for the control device to exchange data with an input output unit 128 connected thereto through a field bus. The internal bus controller 122 and the field bus controller 124 acquire control state values entered into the corresponding input output units 126 and 128 respectively, and outputs the computation results from the processor 102 through the respective input output units 126 and 128 as control commands.

The external network controller 116 controls the exchange of data through various types of wired and wireless networks. The memory card interface 118 is configured to allow the insertion and removal of a memory card 120. The memory card interface 118 is capable of writing data to and reading data from the memory card 120.

The information processing device 200 includes processors 202 such as a CPU or an MPU, a chipset 204, a main memory 206, a hard drive 208, a communication unit 216, a memory card interface 218, and input unit 220, and a display unit 222. The hard drive 208 stores an operating system (OS) that provides a basic program execution environment in the information processing device 200, and a CAD program 212. The information processing device 200 may be implemented using a typical general-purpose personal computer and thus a detailed explanation thereof will not be recited here.

Note, some or all the functions provided by executing programs on the control device 100 and the information processing device 200 may also be implemented in dedicated hardware circuits.

B. Data Exchange

The information processing device 200 uses information from the control device 100 to present a visual representation of the behavior of the manufacturing device 300. Any known technique may be adopted to implement data exchange between the control device 100 and the information processing device 200. An example of a method used for implementing the data exchange between the control device 100 and the information processing device 200 is described. The method of data exchange is not limited to the following description; a suitable method may be appropriately selected in accordance with a specific goal, purpose, implementation cost, network environment, or the like.

Figure 3A:
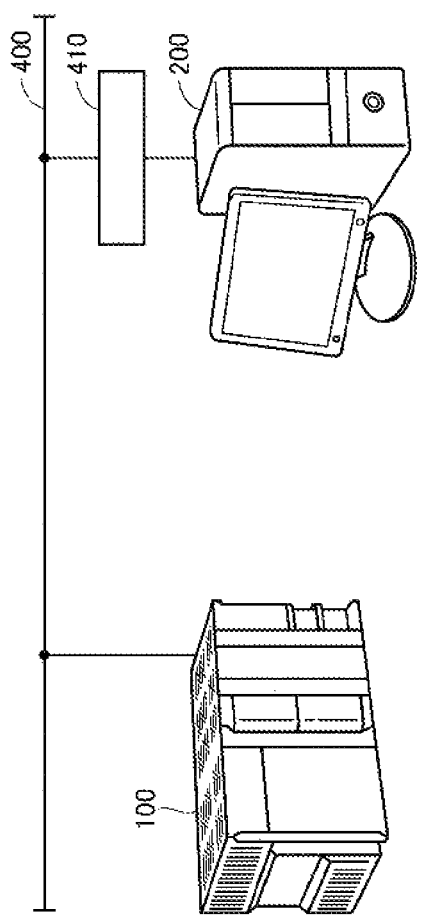
FIGS. 3A through 3C are schematic views exemplifying types of data exchange within the simulation system according to an embodiment of the invention.
Figure 3B:
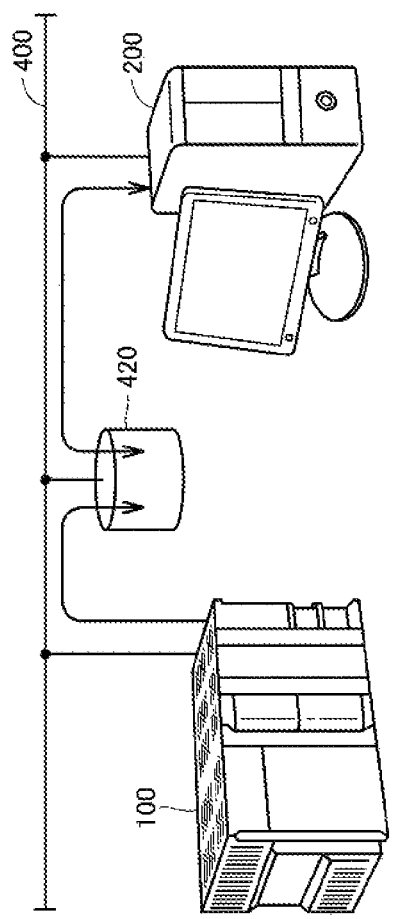
Figure 3C:
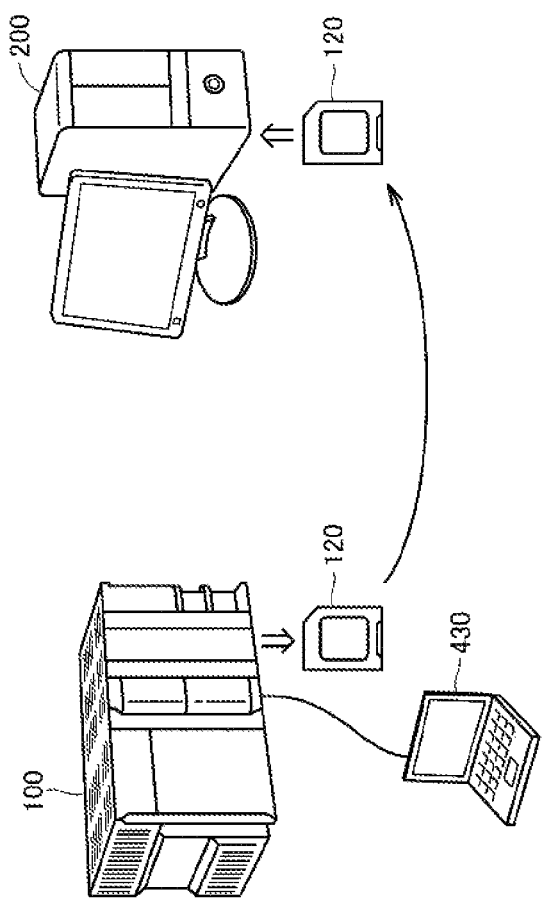

FIGS. 3A through 3C are schematic views exemplifying types of data exchange within the simulation system 1 according to an embodiment.

FIG. 3A is a configuration example suited for presenting a visual representation of the behavior of the manufacturing device 300 in real time. More specifically, in this case, both the control device 100 and the information processing device 200 are connected to and exchange data via a network 400. In this configuration example the control device 100 is connected to the network 400 by the external network controller 116 (refer to FIG. 2), and the information processing device 200 is connected to the network 400 via the communication unit 216 (refer to FIG. 2). Exchanging data via the network 400 allows for high-speed data exchange.

Note, when the communication protocol used by the control device 100 and the information processing device 200 to transmit and receive data are mutually different, a protocol conversion server 410 may be placed along the communication route. The protocol conversion server 410 converts between the protocols used by the control device 100 and the information processing device 200. Moreover, a function for carrying out the same operations as the protocol conversion server 410 may be implemented in at least one of the control device 100 and the information processing device 200.

FIG. 3B is a configuration example suited for presenting a visual representation of the behavior of the manufacturing device 300 after the fact. The configuration example illustrated in FIG. 3B is also particularly suited for cases where there is some kind of malfunction and the cause thereof needs to be investigated, or cases where so-called data mining is required. More specifically, a database device 420 is provided where both the control device 100 and the information processing device 200 are capable of exchanging data with said database device. Typically, the database device 420 stores the data output from the control device 100 at predetermined intervals, while the information processing device 200 accesses the database device 420 and acquires the necessary data. Adopting a database device 420 provided with a general-purpose communication interface allows a single information processing device 200 to be used to present a visual representation of the behavior of the manufacturing device 300 even when a plurality of different kinds of control devices 100 are in place.

FIG. 3C is a configuration example suited for presenting a visual representation of the behavior of the manufacturing device 300 after the fact. More specifically, in this case the various kinds of data maintained in the control device 100 can be copied onto the information processing device 200 via a memory card 120. The control device 100 writes data to the memory card 120 via the memory card interface 118 (refer to FIG. 2), and the information processing device 200 reads the data from the memory card 120 via the memory card interface 218 (refer to FIG. 2).

In the configuration illustrated in FIG. 3C, a support device 430 may be connected to the control device 100. The support device may be configured to read the data in the control device 100 and write the data to the memory card 120. Additionally, there is no need for a network connection in the configuration exemplified in FIG. 3C, therefore, the necessary data may be extracted to the memory card 120 when there is a malfunction of some kind, providing the advantage that the extracted data may be analyzed in various ways.

Next, an example is described of exchanging data between the control device 100 and the information processing device 200. FIG. 4 is a schematic view exemplifying the data exchanged within the simulation system 1 according to an embodiment. Referring to FIG. 4, the current value of the data maintained in the control device 100 is stored at predetermined intervals. Note that the variable labeled "count value" in FIG. 4 represents an absolute time managed by the control device 100 or a control system that includes the control device 100. Thus, the time can be determined using the count value. The current value of a preliminarily specified piece of data (variable) at each time is stored in association with each count value. It is possible to determine the state of the manufacturing device 300 controlled by the control device 100 using chronologically ordered data associated with a count value. The information processing device 200 may thus use this data in presenting a visual representation of the behavior of the manufacturing device 300.

The control device 100 is capable of repeatedly executing each user program in a plurality of user programs during a plurality of mutually different task periods. In such a case, a single count value is preferably configured to coincide with any of the task periods. For instance, the control device 100 may be configured to transmit a current value each millisecond. It is thus possible to reproduce the behavior of the manufacturing device 300 at each millisecond using this kind of data.

Note that in the configuration example illustrated in FIG. 3A, the control device 100 may be configured to transmit the current value each interval the data is updated (that is, a time interval corresponding to a single count value). Alternatively, when strict real-time performance is not required, the current value may be collected and transmitted at an integer multiple of times of each interval the data is updated. For instance, the current values for 10 intervals may be transmitted for an interval corresponding to 10 count values).

C. Device Development Process

Before detailing the functions and merits of the simulation system 1 according to the embodiment, a manufacturing device development process is described. This device development process is one of the processes in which the simulation system 1 can be adopted.

Figure 5:
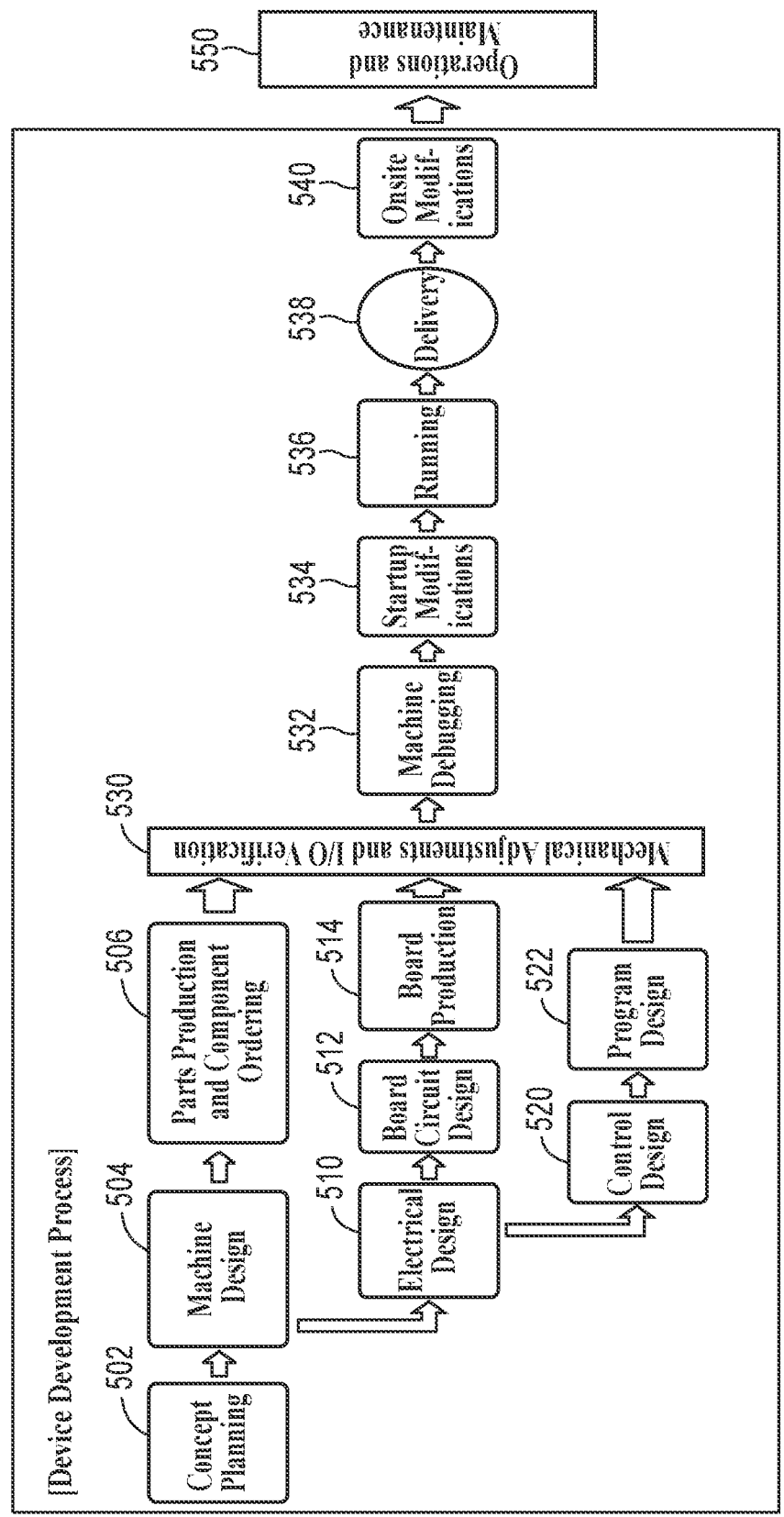
FIG. 5 is a schematic view illustrating a general development process.

FIG. 5 is a schematic view illustrating a general development process. FIG. 5 exemplifies, for instance, a time line of events where a device vendor develops a manufacturing device in accordance with a customer's request. Developing a manufacturing device involves the design and production of the manufacturing device, and may include the design and production of various control devices along with the user programs for controlling the manufacturing device.

More specifically, the concept planning phase 502 is first. A non-detail specification of the manufacturing device is developed during the concept planning phase 502 on the basis of specifications provided by the customer. Next is the machine design phase 504. The structure of each component as well as that of the overall manufacturing device is determined during the machine design phase 504. Once the machine design phase 504 is complete, the parts and components needed for assembling the manufacturing device are ordered and produced (parts production and component ordering phase 506). The machine design phase 504, and the parts production and component ordering phase 506 deal with the manufacturing device as a single unit.

The electrical design phase 510 begins once the machine design phase 504 has progressed to a certain point. During the electrical design phase 510, the electrical interfaces (control signals or state monitoring signals, and the like) required for operating the manufacturing device are determined on the basis of the specifications produced during the machine design phase 504. Once the electrical specifications are decided, the design of the necessary control boards and the built-in electrical circuits (the board and circuit design phase 512) begins. Once the design phase is complete, the actual production of the control board begins (board production phase 514).

The control design phase 520 then commences once the electrical design phase 510 has progressed to a certain point. The various specifications for controlling the manufacturing device are determined during the control design phase 520. Once the control specifications are determined, the program design phase 522 begins. The various user programs executed on the control device 100 are created during the program design phase 522.

When the respective designs, i.e., mechanical, electrical, and control are complete, the relevant parts are assembled, modified, and verified (mechanical adjustments and I/O verification phase 530). During this stage, the control board, the control device, and the like are assembled into the manufacturing device after verifying the operation of and adjusting the assembled unit of the manufacturing device. Moreover, whether the device is wired correctly is verified. When the assembly and the verification of the overall device are complete, the mechanical behavior of the manufacturing device is verified (machine debugging phase 532). Subsequently, the manufacturing device is run and the necessary adjustments made between the manufacturing device, the control board, the control device, and the like (startup adjustments phase 534). Thereafter, the manufacturing device is run to determine whether or not there any defects. The necessary adjustments are then made (running phase 536).

The manufacturing device is delivered to the customer after a series of adjustments and test operations are complete (delivery 538). The manufacturing device is put into real operation and it is determined whether or not there are any defects and the necessary adjustments made (on-site adjustments 540). The manufacturing device is transitioned into actual operation after the on-site adjustments phase 540 is complete, and development enters the operation and maintenance phase 550.

The simulation system 1 of the embodiment uses data used for controlling the manufacturing device 300, and design data (3D form data) to simulate the behavior of the manufacturing device 300. The design data represents at least a portion of the manufacturing device 300. That is, the simulation system 1 of the embodiment presents a visual representation of the behavior of the manufacturing device 300 in real time or after the fact. Three example applications of this kind of function are described below. Namely, the example applications are: (1) troubleshooting; (2) tuning; and (3) virtual debugging.

(1) The troubleshooting feature, and particularly the feature of troubleshooting using a reproduced fault assists with investigating the cause of the abnormal behavior of the manufacturing device 300. Alternatively the troubleshooting feature may also assist with creating solutions for the abnormalities found.

(2) The tuning feature assists with adjusting various parameters in the control device 100 and the manufacturing device 300 to obtain even higher performance from the manufacturing device 300.

(3) Finally, the virtual debugging feature assists with evaluating the behavior of the overall manufacturing device or evaluating the appropriateness of the design thereof. This evaluation can take place before the manufacturing device 300 is assembled, or even before the mechanical design of the manufacturing device 300 is complete.

Each function is described below. The simulation system 1 of the embodiment does not need incorporate all these features. A single feature or a plurality of features may be optionally incorporated as needed. Moreover, other features may be incorporated into a portion or into all of these features.

D. The Troubleshooting Feature

The manufacturing device 300 is put into actual operation during the operation and maintenance phase 550, the on-site adjustments phase 540, the running phase 536, and the start-up adjustments phase 534 illustrated in FIG. 5. When some kind of fault occurs while the manufacturing device 300 is operating in these stages, the cause of the fault must be investigated. The troubleshooting feature is suited to this kind of situation. In particular, the information processing device 200 stores the control device data, and design data representing at least a portion of the manufacturing device 300. Thus, it is possible to reproduce the behavior of the manufacturing device 300 in the information processing device 200 without needing to verify the manufacturing device 300 onsite where the device is installed. For that reason the simulation system 1 is capable of dealing with the following problems.

A manufacturing device at a remote location (for example, overseas) malfunctions for an unknown reason.

A manufacturing device at a remote location (for example, overseas) shuts down frequently for an unknown reason.

Difficulties in performing a test to replicate the problem to thereby determine a cause because the malfunction occurs infrequently.

The manufacturing device begins to behave abnormally after changing the sensors therein.

The manufacturing device has suddenly shutdown for an unknown reason.

The above described issues are examples of issues that typically occur in the device during the operation and maintenance phase 550 illustrated in FIG. 5. However, the troubleshooting feature may be used to solve issues occurring during other stages.

The data the control device 100 uses to control the control object (i.e., "control device data") is used to create a visual representation (reproduce) the behavior of the manufacturing device 300 (i.e., the control object). The control device data may include, for instance, chronological data used to control opening and closing a valve, or the chronological data used to control the lighting of a lamp.

Figure 6A:
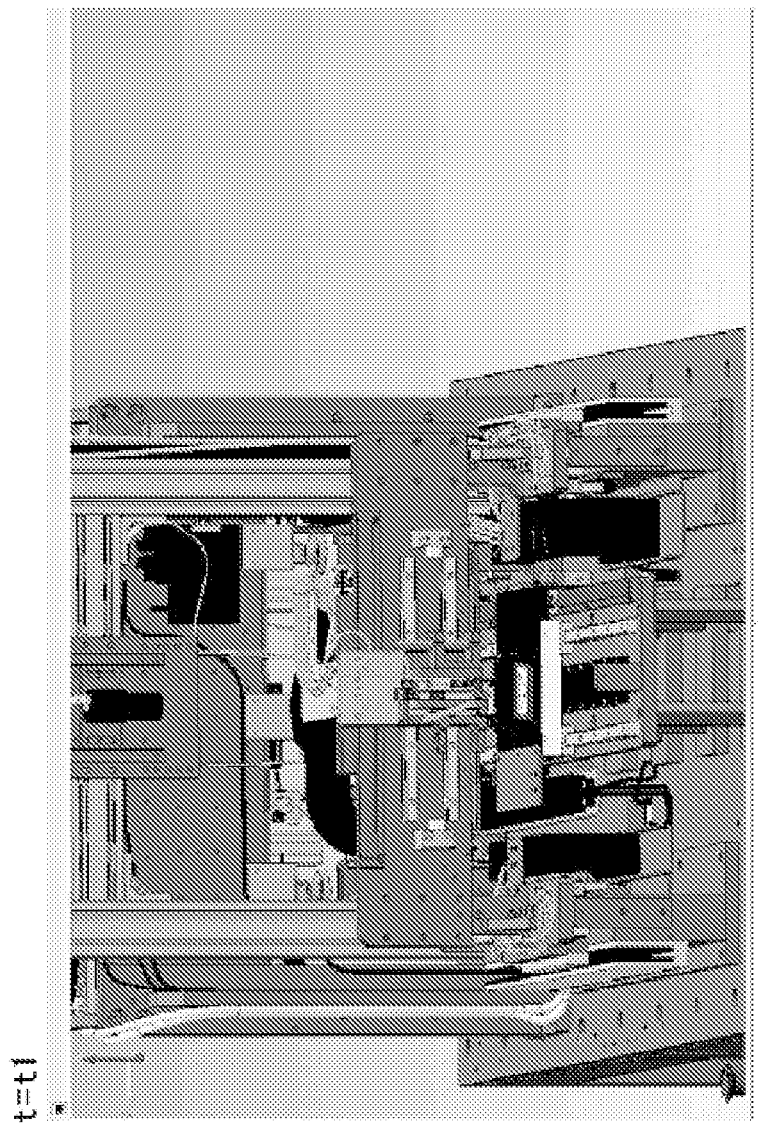
FIGS. 6A and 6B are examples of a display screen the simulation system according to an embodiment presents during troubleshooting using a reproduced fault.
Figure 6B:
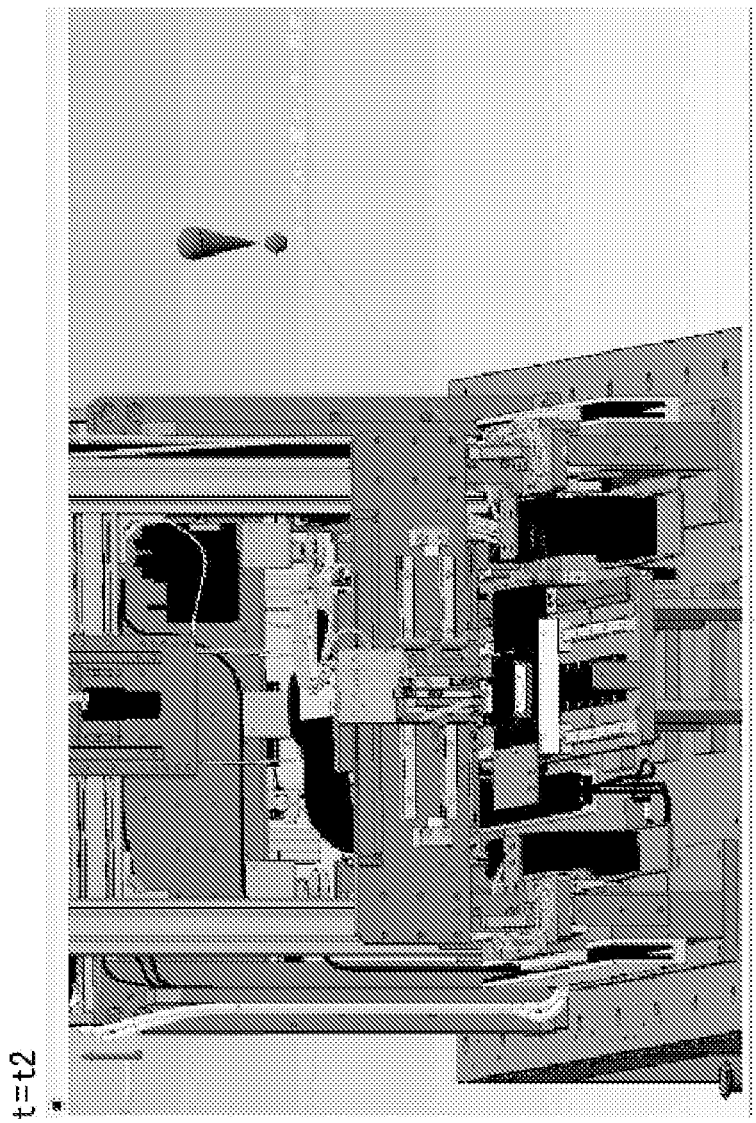

FIGS. 6A and 6B are examples of a display screen the simulation system 1 according to an embodiment presents during troubleshooting using a reproduced fault. FIGS. 6A and 6B depict a CAD drawing of a device used to transport and process a work piece; the device is one example of the manufacturing device 300. The simulation system 1 of the embodiment uses the design data to reproduce the structure of the manufacturing device 300 on the screen. The simulation system 1 also uses the control device data to place each of the relevant parts of the manufacturing device 300 at a location at each time period sequentially, to thereby present a visual representation of the behavior of the manufacturing device 300.

FIG. 6A illustrates the state of the manufacturing device at a time t=t1 before the occurrence of the malfunction; FIG. 6B illustrates the state of the manufacturing device at the moment the malfunction occurs, time t=t2. FIG. 6B exemplifies visually presenting the site of a malfunction. Namely, FIG. 6B illustrates an example where a table position sensor in the manufacturing device 300 enters an abnormal state, and stops operating. In this case, the simulation system 1 displays the location of the table position sensor, and the details thereof in a message at the point in time the malfunction occurred. Providing such a user interface allows the user (operator or maintenance person) to immediately assess the reason the manufacturing device 300 has stopped operating.

Thus, the information processing device 200 uses the fixed interval of control device data, and the design data to present a visual representation of the control object around a period in time that satisfies a predetermined criteria (for instance, the occurrence of a malfunction). The information processing device 200 uses the fixed interval of control device data that is output from the control device 100. In particular, the information processing device 200 utilizes the fixed interval of control device over a predetermined period that includes the aforementioned period in time. Moreover, as illustrated in FIG. 6B, the information processing device 200 presents a visual representation of the site associated with the predetermined criteria.

Figure 7A:
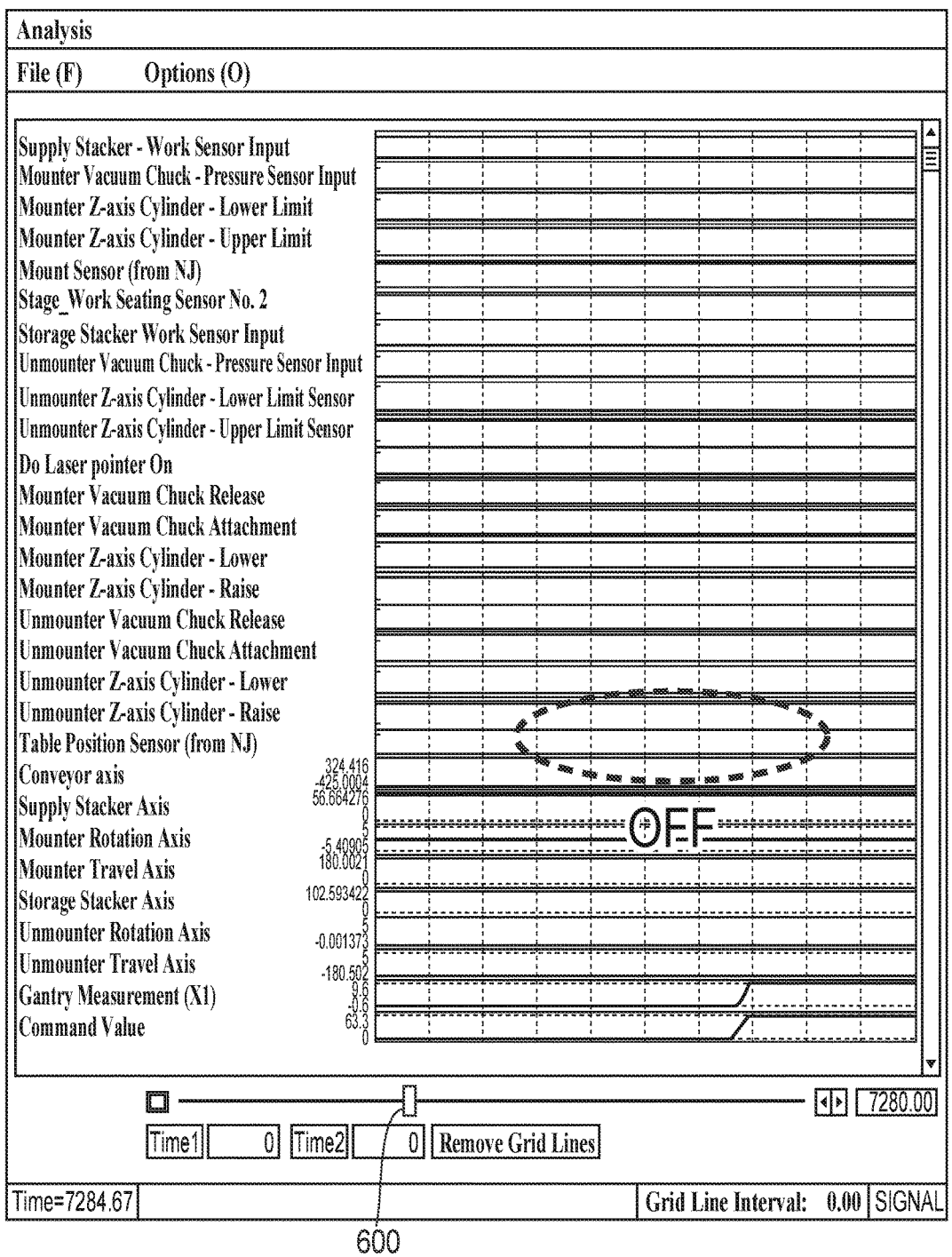
FIGS. 7A and 7B are for comparing a time chart corresponding to the malfunction reproduced in FIG. 6B, and a time chart corresponding to a normal operation.
Figure 7B:
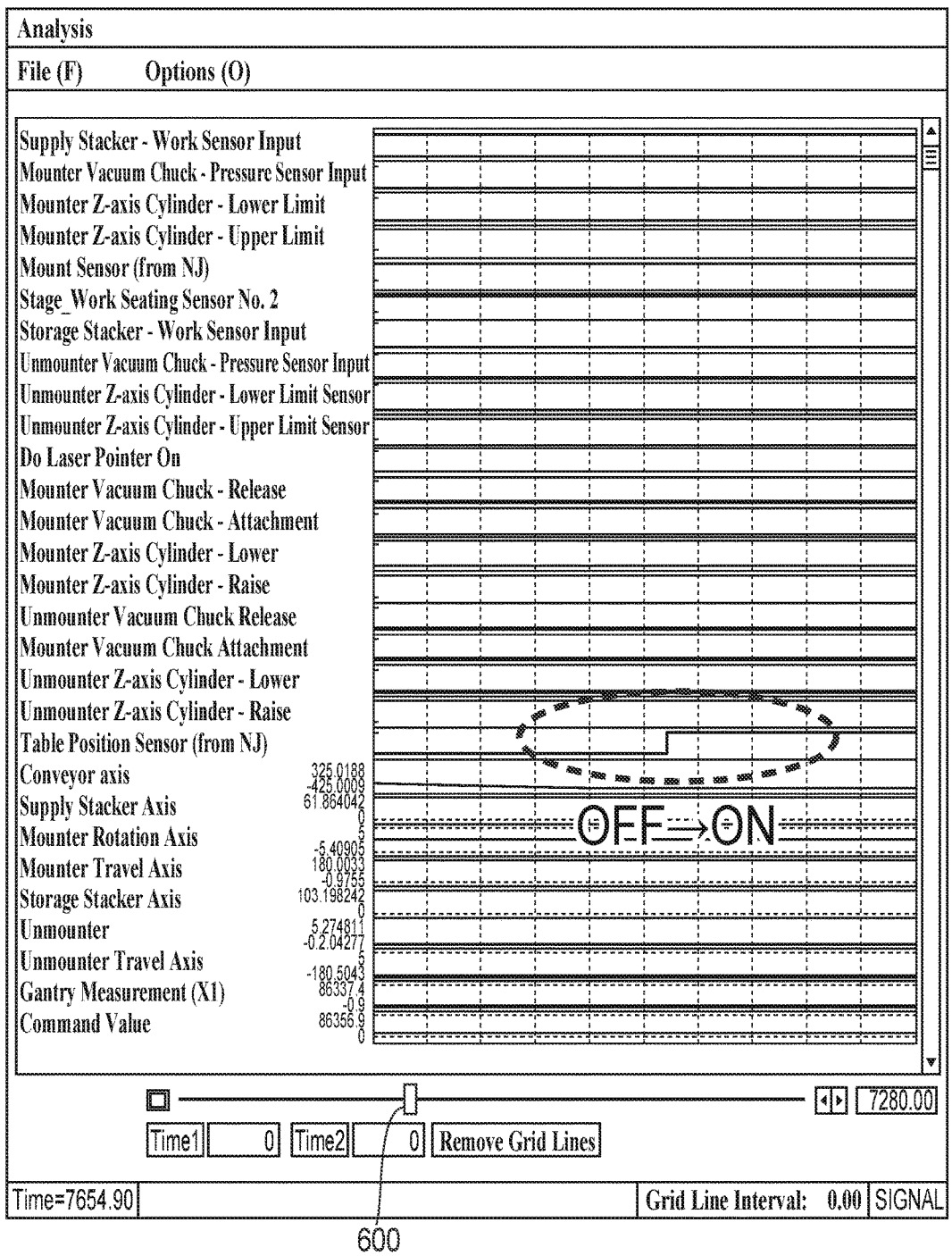

FIGS. 7A and 7B are for comparing a time chart corresponding to the malfunction reproduced in FIG. 6B, and a time chart corresponding to a normal operation. FIG. 7A illustrates the time chart of when the malfunction occurred, and FIG. 7B is a time chart of a normal operation. The simulation system 1 of the embodiment may include an analysis module that contains a function that displays these kinds of time charts. Comparing FIGS. 7A and 7B, the table position sensor, which would normally change from off to on during normal operation, remains off when the malfunction occurs. Thus, it is possible to determine there is an abnormality with the table position sensor (more specifically, a malfunction or a disconnection of the sensor itself) by comparing the time charts in this manner Note that, the user may manipulate a slide bar 600 at the lower part of the time charts illustrated in FIGS. 7A and 7B to freely change the point in time of the behavior being reproduced as illustrated in FIGS. 6A and 6B for the manufacturing device 300. Namely, the information processing device 200 displays an operational input element (the slide bar 600) for accepting user commands for the purpose of setting the time period for which a visual representation of the behavior of the control object is presented.

Figure 8:
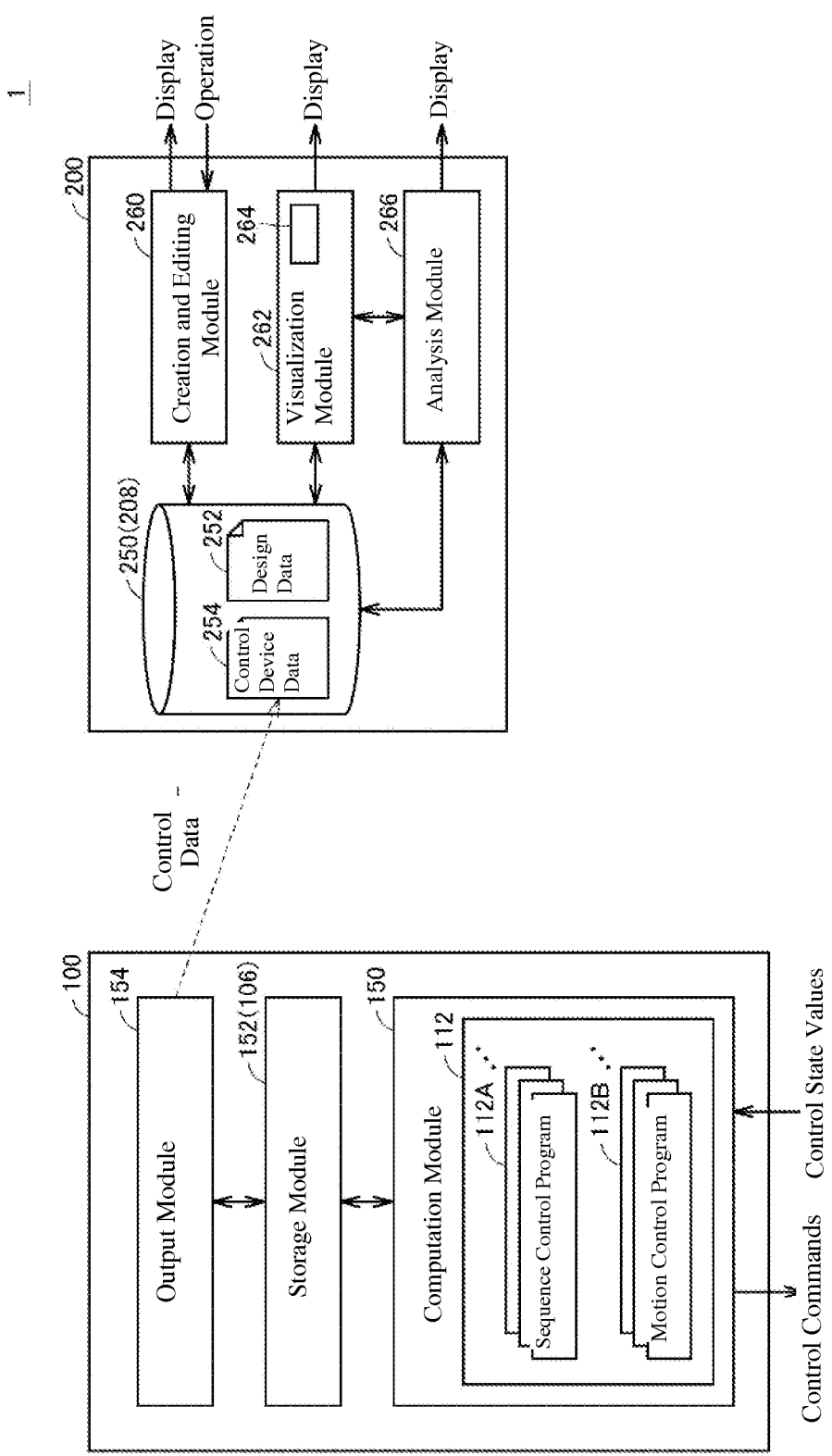
FIG. 8 is a schematic view illustrating a functional configuration of a feature that allows for troubleshooting using a reproduced fault (troubleshooting feature) provided by the simulation system according to an embodiment.

FIG. 8 is a schematic view illustrating a functional configuration of the troubleshooting feature provided by the simulation system 1 according to an embodiment. Referring to FIG. 8, the control device 100 includes a computation module 150, a storage module 152, and an output module 154 which make up the primary functions thereof.

The computation module 150 is the primary agent executing sequence control and motion control of the control object. The computation module 150 carries out control by running a user program 112 containing a sequence control program 112A and a motion control program 112B.

The storage module 152 stores control commands calculated in accordance with computations in the computation module 150, and control state values acquired at predetermined intervals from the control object and the like. The storage module 152 is realized primarily in at least one region of the main memory 106 (refer to FIG. 2).

The output module 154 outputs the control device data stored in the storage module 152 to the information processing device 200. That is, the output module 154 outputs the data related to the sequence control and the motion control of the control object at fixed intervals. The output module 154 is typically implemented using at least a part of the external network controller 116 and the memory card interface 118 (both illustrated in FIG. 2).

On the other hand, the information processing device 200 contains a storage module 250, a creation and editing module 260, a visualization module 262, and an analysis module 266 as its principal functions.

The storage module 250 stores design data 252, which is 3D form data for the manufacturing device 300, and control device data 254 acquired from the control device 100. Namely, the storage module 250 stores the design data 252 representing at least a portion of the manufacturing device 300, which is the control object. The storage module 250 is realized primarily in at least one region of the hard drive 208 (refer to FIG. 2).

The creation and editing module 260 primarily implements the CAD program 212 (refer to FIG. 2), and provides a means for creating and editing the design data 252.

The visualization module 262 is configured primarily for providing the troubleshooting feature, and uses the design data 252 and the control device data 254 to reproduce the behavior of the manufacturing device 300. That is, the visualization module 262 presents a visual representation of the behavior of the manufacturing device 300, which is the control object. In particular, the visualization module 262 uses the control device data 254 and the design data 252 to present a visual representation of the control object around a period in time that satisfies a predetermined criteria (e.g., the occurrence of a malfunction). The control device data 254 that the visualization module 262 uses is the fixed interval of data output from the control device 100, and specifically the fixed interval of control device data output over a predetermined period that includes the aforementioned period in time.

Additionally, the visualization module 262 may reference a preliminarily configured conversion table 264 and perform numerical conversions to associate each of the values contained in the control device data 254 output from the control device 100 with the design data 252. For instance, the conversion table 264 may define a conversion constant where a single digit output from the control device 100 corresponds to X millimeters in the design data 252; thus it is possible to reference this conversion table 264 to reproduce the behavior of the manufacturing device 300.

The analysis module 266 is a supplementary module that aligns and presents a preliminarily specified one of either the control state values contained in the control device data 254 and/or the control commands on the same time axis (refer to FIG. 7). Namely, the analysis module 266 aligns and presents the control state values for a plurality of entries included in the fixed interval of data output from the control device 100 on the same time axis. The control commands included in the data output may include control commands for "Supply Stacker_Work Piece Sensor Input", "Post Mounter Vacuum Chuck_Pressure Sensor Input", and the like. Providing this kind of display facilitates verification of which of the values may be the cause when some kind of malfunction occurs.

As described above, the system according to the embodiment is capable of reproducing the behavior of the manufacturing device 300 (the mechanical operations) back to the time of the malfunction. Thereby, the system according to the embodiment allows for early identification of, and prompt recovery from the cause of the malfunction even when the actual manufacturing device 300 is in a remote location. Providing this environment simplifies the maintenance of a remote manufacturing device, or that of a manufacturing device that has malfunctioned. That is, so long as the control device data from the control device 100 is retrievable, the cause of a malfunction may be investigated, and the behavior of the manufacturing device may be analyzed without having to travel on-site.

E. Tuning Feature

The manufacturing device 300 is actually put into operation and various adjustments carried out to achieve a target performance level during the operation and maintenance phase 550 and the on-site adjustments phase 540 illustrated in FIG. 5. In numerous cases, various parameters are adjusted through trial and error to achieve this kind of target performance. A parameter could be, for example, the time until a second valve opens after a certain first valve opens, and the like. This kind of adjustment process takes a lot of time, and requires a certain kind of experience. The simulation system 1 according to the embodiment addresses primarily streamlining this kind of adjustment process. Namely the simulation system 1 is capable of dealing with the following problems.

The amount of time required to operate the manufacturing device numerous times to determine the appropriateness of the behavior of the device through visual inspection (trial and error).

Repeated trial and error to determine optimal parameters.

Unsatisfactory tuning when the operator is not experienced at determining the appropriateness of the acquired data values.

The above-described issues are examples of problems that typically occur during the on-site adjustments phase 540 and the operation and maintenance phase 550. However, the troubleshooting feature may be used to solve issues occurring during other stages.

According to the embodiment, during tuning, the simulation system 1 extracts the data corresponding to each of the parameters that is a candidate for tuning in order from the data the control device 100 uses to control the control object (control device data). A visual representation of a plurality of behaviors of the manufacturing device 300 is presented (reproduced) whereby the appropriateness of all the behaviors can be evaluated.

Figure 9A:
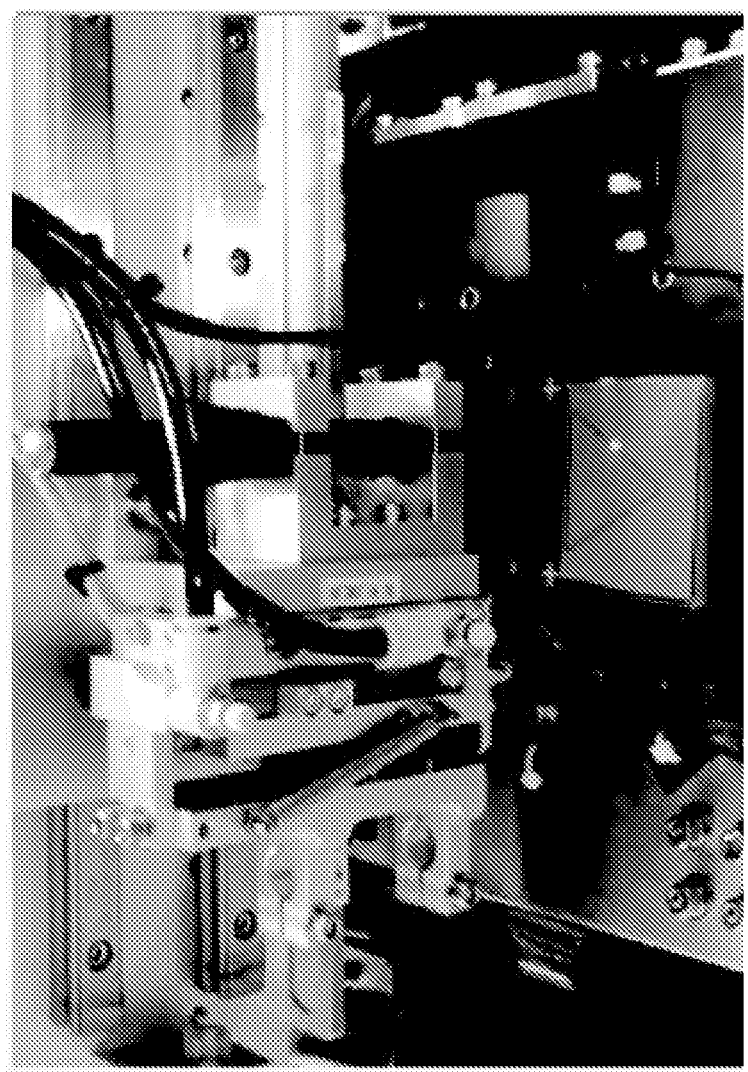
FIGS. 9A and 9B are diagrams for explaining a tuning feature provided by the simulation system according to an embodiment of the invention.
Figure 9B:
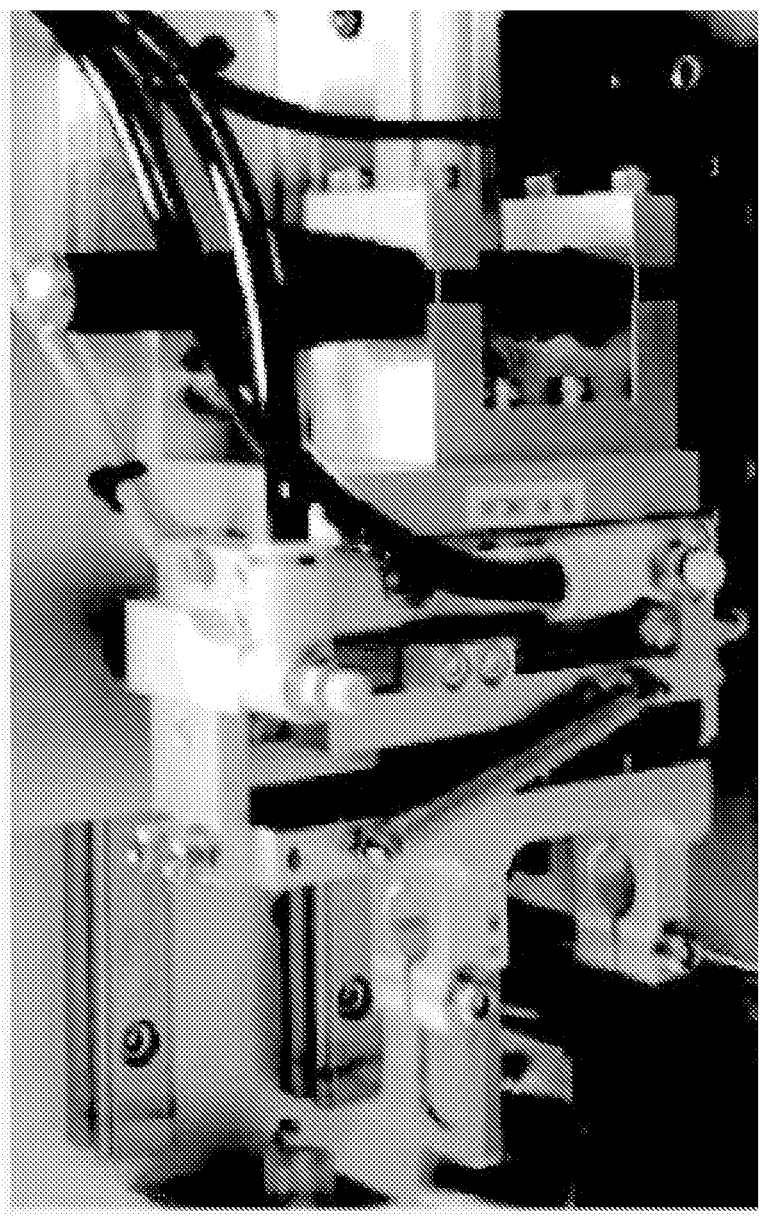

FIGS. 9A and 9B are diagrams for explaining the tuning feature provided by the simulation system 1 according to the embodiment. FIG. 9A illustrates the manufacturing device 300 to be tuned, and FIG. 9B exemplifies the display presented during tuning. The simulation system 1 according to the embodiment uses the data the control device 100 uses to control the manufacturing device 300, and the design data to reproduce the structure of the manufacturing device 300 on a screen. The simulation system 1 selectively extracts the control device data from the control device 100 and presents a visual representation of the behavior of the manufacturing device for each parameter that is a candidate for tuning.

FIGS. 9A and 9B illustrate examples of a manufacturing device 300 that laser machines a work piece. In the particular example illustrated, the adjustment of a driver used to drive the laser increases the machining accuracy; however, a lot of time and manual labor is required to determine whether any of the parameters further improves the accuracy of the device. According to the embodiment, a parameter is varied to have multiple values during tuning. The behavior of the manufacturing device 300 in each of those cases is collected as the control device data, and the behavior of the manufacturing device 300 reproduced on the basis of the collected control device data.

When reproducing the behavior of the manufacturing device for these various instances, for example, the behavior of the manufacturing device may be replayed slowly, to verify the device behavior, using each accumulation period of the control device data as a unit of time. While verifying the behavior through slow replay, for instance, adjustments to the driver gain, or the effect of a correction technique may be evaluated to select a suitable tuning parameter. For example, providing a magnified display of the area near an machining inflection point on a screen presenting a reproduction of the behavior of the manufacturing device 300 as illustrated in FIG. 9B, would allow an operator to assess the machining accuracy.

Figure 10:
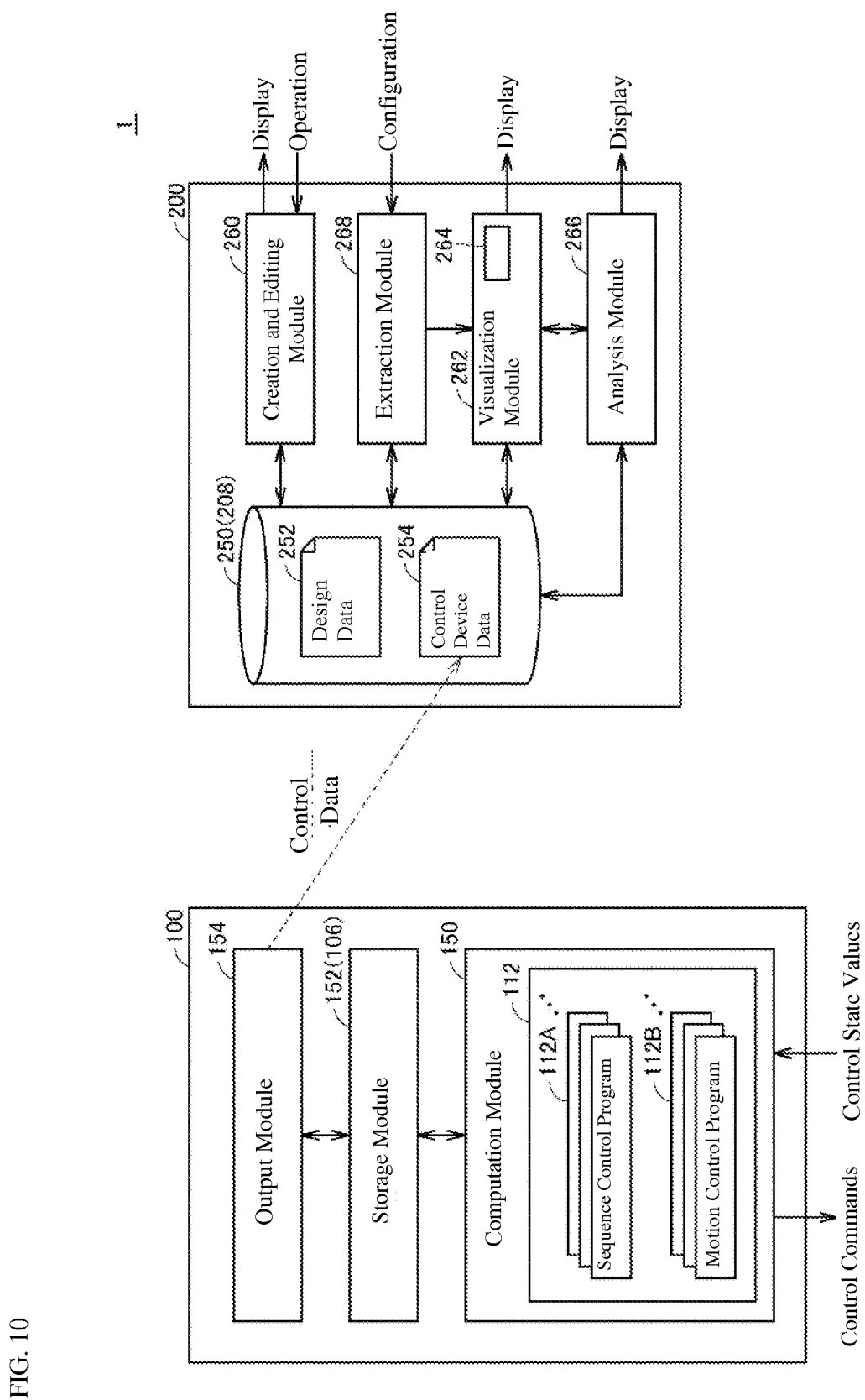
FIG. 10 is a schematic view illustrating a functional configuration of the tuning feature provided by the simulation system according to an embodiment.

FIG. 10 is a schematic view illustrating a functional configuration of the tuning feature provided by the simulation system 1 according to the embodiment. Referring to FIG. 10, the control device 100 contains a computation module 150, a storage module 152, an output module 154, and an extraction module 268 which make up the primary functions thereof. The computation module 150, the storage module 152, and the output module 154 are identical to the modules illustrated in FIG. 8 and thus an explanation thereof is not repeated here.

The extraction module 268 sequentially extracts data from the control device data 254 in accordance with settings selected by the user. For example, when a user attempts to determine the optimum value for a certain parameter, if the adjustment range is 1 to 10, the extraction module 268 extracts the control device data for each of the cases where the relevant parameter is the value 1, 2, . . . , 10. Each of the extracted control device data is used to reproduce the behavior of the manufacturing device 300 in each of those cases.

Each of the control device data is acquired in this manner when a plurality of parameters are selected, and the behavior of the manufacturing device 300 is reproduced in each of the cases using the acquired control device data. Each of the cases is then compared to one another. The most accurate parameter or correction technique is selected as the final tuning result.

As above described, according to the embodiment, the behavior or the mechanical movements of the manufacturing device 300 can be correctly reproduced during tuning, whereby the reproduction of the behavior can be used to quantitatively evaluate the accuracy of the behavior of the manufacturing device 300. Hereby, in addition to actually operating the manufacturing device 300, the effects due to tuning each of the parameters may be quantitatively evaluated to finally determine whether each of the candidate parameters is an optimum parameter for tuning.

F. Virtual Debugging Feature

During the machine design phase 504 illustrated in FIG. 5, the manufacturing device is designed on the basis of an outline specification. Namely, the designing of the device progresses while the structure and dimensions of the manufacturing device are still ambiguous and have no concrete support. Subsequently, any mistakes during design are often discovered for the first time during the machine debugging phase 532. As a result, the machine design phase 504 must be re-entered, incurring significant labor and cost. Therefore, the ability to assess the suitability of the structure and the dimensions of the manufacturing device during the concept planning phase 502 is desired, to improve design quality.

After the control design phase 520 and the program design phase 522 illustrated in FIG. 5, certain phases of development must be put on hold; for instance, the control device cannot be verified until the mechanical adjustments and I/O verification phase 530 is complete. In other words, the amount of down time between the program design phase 522 and the mechanical adjustments and I/O verification phase 530 may be the reason development requires a long time. Reducing the amount of wait time is also desirable.

The virtual debugging feature built into the simulation system 1 according to the embodiment allows various verifications of the user program to be carried out, and allows evaluation of the basic structure and dimensions of the initially designed manufacturing device. The virtual debugging feature allows this even if the actual manufacturing device 300 does not exist, or, in other words, even if the manufacturing device 300 in design exists merely in a CAD program.

Figure 11:
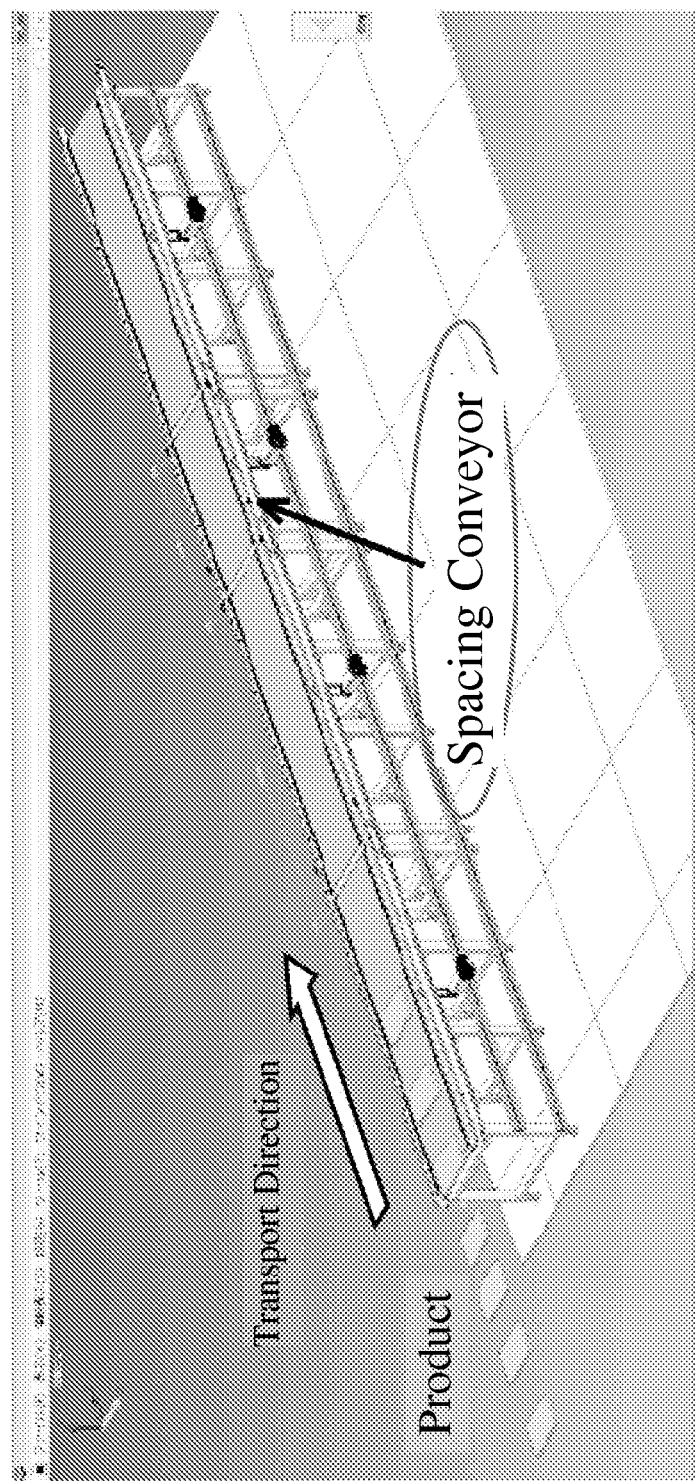
FIG. 11 is a diagram for explaining a virtual debugging feature provided by the simulation system according to an embodiment of the invention.

FIG. 11 is a diagram for explaining the virtual debugging feature provided by the simulation system 1 according to the embodiment. FIG. 11 illustrates a sorting conveyor as an example of a manufacturing device 300 in development. The sorting conveyor places each work piece thereon at equal intervals. Work pieces traveling randomly on a conveyor are arranged at equal intervals at the third conveyor arranged upstream (referred to below as a "spacing conveyor"). Described is an example of designing the dimensions (length) of the spacing conveyor.

To run a simulation, the main components of the conveyor are drawn in the CAD program on the information processing device 200. Alternatively, the design data for the conveyor may be created in the CAD program. The user program that will run on the control device 100 is also created. The user program is typically created using a support device provided for the control device 100. The simulation system 1 links the control device 100 and the information processing device 200 to run the simulation (perform debugging).

While the user program may be run on the control device 100, the user program may also be run on a version of the control device 100 emulated on a personal computer. That is, the control device 100 may be realized in an emulator run on a computer.

When the control device 100 is emulated, the information processing device 200 may move a manipulated object (for example, the "product" depicted in FIG. 11) in a virtual space in accordance with control commands from the emulated control device 100. At the same time the information processing device 200 responds to the emulated control device 100 with output from a sensor (control state values) through emulation in accordance with preliminarily configured criteria. Namely, the control device 100 and the information processing device 200 exchange data with each other to perform verifications including those of the control device 100 and the manufacturing device 300, even without an actual manufacturing device 300.

Figure 12:
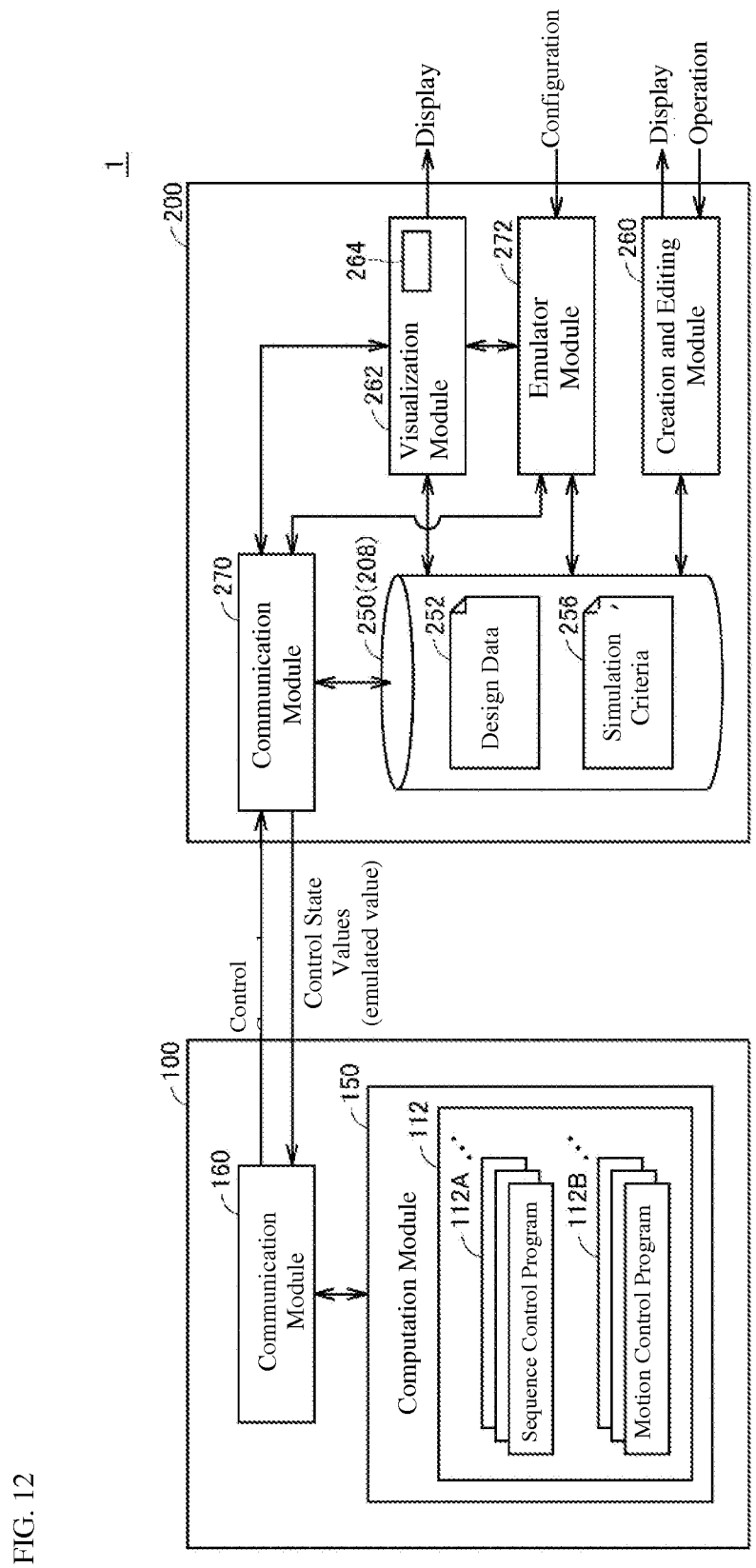
FIG. 12 is a schematic view illustrating a functional configuration of the virtual debugging feature provided by the simulation system according to an embodiment of the invention.

FIG. 12 is a schematic view illustrating a functional configuration of the virtual debugging feature provided by the simulation system 1 according to an embodiment. Referring to FIG. 12, the control device 100 includes a computation module 150, and a communication module 160 which make up the primary functions thereof.

The computation module 150 is the primary agent executing sequence control and motion control of the control object. The computation module 150 carries out control by running a user program 112 containing a sequence control program 112A and a motion control program 112B. The communication module 160 transmits control commands to the information processing device 200 and receives control state values (emulated values) transmitted from the information processing device 200. The control commands are calculated through the computations in the computation module 150. In other words, treating the fixed interval of data (control state values) received from the information processing device 200 as input data, the computation module 150 executes at least one of a preliminarily defined sequence control or motion control and transmits a fixed interval of data (control commands) computed in accordance with the control executed to the information processing device 200 as output data.

The external network controller 116 (refer to FIG. 2) is primarily used for implementing the communication module 160.

On the other hand, the information processing device 200 contains a storage module 250, a creation and editing module 260, a visualization module 262, an emulator module 272, and a communication module 270 as its principal functions.

The storage module 250 stores the design data 252, which is 3D form data for the manufacturing device 300, and simulation criteria 256. The storage module 250 is realized primarily in at least one region of the hard drive 208 (refer to FIG. 2).

The creation and editing module 260 primarily implements the CAD program 212 (refer to FIG. 2), and provides a means for creating and editing the design data 252. That is, the creation and editing module 260 is configured to create and edit the design data representing at least a portion of the configuration of the control object.

The visualization module 262 is primarily configured for implementing simulations. The visualization module 262 uses the design data 252, the control commands from the control device 100, and the control state values generated by the emulator module 272 to reproduce the behavior of the manufacturing device 300. Namely, the visualization module 262 uses the control device data 254 and the design data 252 to present a visual representation of the behavior of the control object. At this point, the visualization module 262 updates the location of an object corresponding to the control object whenever the output data received from the control device 100 is updated.

Note that the visualization module 262 may reference a preliminarily configured conversion table 264 and perform numerical conversions to associate each of the values contained in the control commands from the control device 100 with the design data 252.

The emulator module 272 generates and outputs a control state value when the control commands from the control device 100 satisfy preliminarily configured simulation criteria 256. For example, the simulation criteria 256 may define a condition for a sensor provided along the transport route for a given object. Therefore, when the object in question travels to the location of the sensor in accordance with a control command from the control device 100, the emulator module changes the control state value for the aforementioned sensor (e.g., the emulator module changes the control state value of the sensor from off to on). That is, the emulator module 272 outputs the fixed interval of data according to the behavior of the control object being visualized to the control device. When the output data transmitted from the control device 100 satisfies the predetermined criteria, the emulator module 272 responds to the control device 100 with information indicating that said predetermined criteria is satisfied. In this manner, the information processing device 200 can execute simulations of a combination of the control device 100 and the manufacturing device 300 in accordance with control commands from the emulated control device 100 by realizing the various sensors that would be installed in the manufacturing device 300 virtually.

In the example illustrated in FIG. 11 of the sorting conveyor, during the machine design phase the length and speed of the spacing conveyor are varied in multiple ways, while during the control design phase, the parameters in the user program to be run on the control device 100 are also be varied in multiple ways to find the optimal design parameters.

The simulation system 1 according to the embodiment was actually used to find that the conveyor length of a given sorting conveyor was not optimally designed. Further, the operation of a proposed improvement plan was verified to determine the most suitable conveyor length.

Although the example adopted during the concept planning phase 502 and the machine design phase 504 (refer to FIG. 5) is described, virtual debugging may also be applied in stress testing a program at the end of the program design phase 522. For instance, virtual debugging may be used to verify an interlock mechanism, the independent operation of an actuator, the continuous operation of a sequence, and the like.

Thus, as described above, the appropriateness of combining a machine design and a user program can be evaluated using the virtual debugging feature according to the embodiment during the concept planning phase for the manufacturing device 300. That is, an outline structural diagram of the manufacturing device 300 and the basic operations of the user program may be used to verify the operations of the manufacturing device 300. Consequently, with this kind of verification, design mistakes may be found during the concept planning phase, and losses (such as man hours, and materials) may be reduced.

Additionally, the amount of time required for debugging using the actual manufacturing device 300 may be reduced by using the virtual debugging feature according to the embodiment to debug the manufacturing device 300 before the manufacturing device and control device are combined.

The virtual debugging feature may also be used to debug the user program using the design data.

The control device 100 and the information processing device 200 exchange data with each other in the simulation system 1 according to the embodiment. Thereby, the information processing device 200 can provide a more accurate reproduction of the behavior of the manufacturing device being controlled by the control device 100. This consequently allows for more suitable verification and evaluation of the behavior of the manufacturing device.

If the overall structure of the manufacturing device is designed on the information processing device 200, the combined behavior of the concept version of the manufacturing device and the control device 100 may be simulated. It is thereby possible to verify and evaluate the suitability of the behavior of an entire system that includes the manufacturing device.

All aspects of the embodiment disclosed should be considered merely as examples and not limitations as such. The scope of the present invention is not limited to the above description but to the description in the claims, and is intended to include all equivalents and modifications allowable by the claims.

The invention claimed is:

1. A simulation system comprising:
a control device comprising an output module; and
an information processing device coupled to the output module, wherein:
the control device is configured to control a control object, the control device comprising a computation unit configured to execute sequence control and motion control of the control object, the control device acquiring control state values based on executing the sequence control and the motion control of the control object;
the output module is configured to output, to the information processing device, the control state values acquired over a fixed interval of time related to the executed sequence control and the motion control of the control object; and
the information processing device is configured to exchange data with the control device, the information processing device comprising:
a storage module; and
a visualization module, wherein
the storage module is configured to store design data representing at least a portion of a configuration of the control object;
the visualization module is configured to create a visual representation of a behavior of the control object around a period in time that satisfies a predetermined criteria, using the control state values over the fixed interval of time output from the output module, the design data, and a conversion table comprising one or more conversion constants enabling numerical conversions that associate each of the control state values over the fixed interval of time with the design data, where the control state values over the fixed interval of time used by the visualization module comprises the control state values over a predetermined period that comprises the period in time that satisfies the predetermined criteria, and the one or more conversion constants enabling the numerical conversions by associating each of the control state values over the fixed interval of time with a corresponding distance in the design data so as to reproduce the behavior of the control object during the predetermined period; and the visual representation of the control object is to be presented on a display to facilitate troubleshooting or adjustment of the control device for the predetermined period based on the reproduced behavior.

2. The simulation system according to claim 1, wherein the information processing device further comprises an analysis module configured to align and present control state values for a plurality of entries included in the control state values over the fixed interval of time output from the control device on the display to facilitate the troubleshooting or adjustment of the control device.

3. The simulation system according to claim 1, wherein the information processing device displays, on the display, an operational input element that accepts a user command setting a time period for which the visual representation of the behavior of the control object is presented.

4. The simulation system according to claim 1, wherein the information processing device presents, on the display, a visual representation of a site associated with the predetermined criteria.

5. A simulation system comprising:
a control device comprising a computational module; and
an information processing device comprising:
  a creation and editing module;
  a visualization module; and
  an output module, wherein:
the control device is configured to control a control object;
the computation module is configured to:
  input control state values over a first fixed interval of time received from the information processing device,
  execute at least one of a preliminarily defined sequence control or a motion control on the control object, and
  transmit control state values over a second fixed interval of time computed in accordance with the control executed on the control object based on the control state values over the first fixed interval of time, to the information processing device as output data;
the information processing device is configured to exchange data with the control device,
the visualization module is configured to present a visual representation of a behavior of the control object using the output data from the control device, design data representing at least a portion of a configuration of the control object, and a conversion table comprising one or more conversion constants enabling numerical conversions that associate each of the control state values over the fixed interval of time with the design data, the one or more conversion constants enabling the numerical conversions by associating each of the control state values over the fixed interval of time with a corresponding distance in the design data so as to reproduce the behavior of the control object during a predetermined period;
the output module is configured to output the control state values over the first fixed interval of time according to the behavior of the control object being visually presented to the control device;
the visual representation of the control object is to be presented on a display to facilitate troubleshooting or adjustment of the control device for the predetermined period based on the reproduced behavior; and
the creation and editing module is configured to create and edit the design data based on the visual representation so as to facilitate the troubleshooting or adjustment of the control device.

6. The simulation system according to claim 5, wherein the information processing device responds to the control device with information indicating that a predetermined criteria is satisfied when the data output from the control device satisfies the predetermined criteria.

7. The simulation system according to claim 5, wherein the control device is implemented in an emulator run on a computer.

8. The simulation system according to claim 5, wherein the visualization module updates a location of an object corresponding to the control object whenever the data output from the control device is updated.

* * * * *